(12) United States Patent
Chen et al.

(10) Patent No.: US 8,020,213 B2
(45) Date of Patent: Sep. 13, 2011

(54) ACCESS CONTROL METHOD AND A SYSTEM FOR PRIVACY PROTECTION

(75) Inventors: Weifeng Chen, Amherst, MA (US);
Alexandre V. Evfunievski, San Jose, CA (US); Zhen Liu, Tarrytown, NY (US); Ralf Rantzau, San Jose, CA (US); Anton Viktorovich Riabov, Ossining, NY (US); Pankaj Rohatgi, New Rochelle, NY (US); Angela Marie Schuett, Columbia, MD (US); Ramakrishnan Srikant, San Jose, CA (US); Grant Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 11/496,821

(22) Filed: Aug. 1, 2006

(65) Prior Publication Data

US 2008/0034439 A1 Feb. 7, 2008

(51) Int. Cl.
*G06F 7/04* (2006.01)
(52) U.S. Cl. .............................. 726/27; 726/2
(58) Field of Classification Search ............... 726/3, 14, 726/26–30, 2, 4, 5, 6, 18, 19; 709/3; 713/182–185, 713/164–167; 705/54, 62, 67, 70, 74, 75; 707/705, 781, 783–785
See application file for complete search history.

(56) References Cited

U.S. PATENT DOCUMENTS

| | | | | |
|---|---|---|---|---|
| 5,864,683 A | * | 1/1999 | Boebert et al. | 709/249 |
| 6,105,132 A | * | 8/2000 | Fritch et al. | 713/167 |
| 6,292,900 B1 | * | 9/2001 | Ngo et al. | 726/6 |
| 6,931,411 B1 | * | 8/2005 | Babiskin et al. | 1/1 |
| 7,134,022 B2 | * | 11/2006 | Flyntz | 713/182 |
| 7,676,673 B2 | * | 3/2010 | Weller et al. | 713/164 |
| 2003/0105979 A1 | * | 6/2003 | Itoh et al. | 713/201 |
| 2003/0167269 A1 | * | 9/2003 | Gupta | 707/9 |
| 2004/0044655 A1 | * | 3/2004 | Cotner et al. | 707/3 |
| 2004/0225883 A1 | * | 11/2004 | Weller et al. | 713/166 |
| 2005/0044409 A1 | * | 2/2005 | Betz et al. | 713/201 |
| 2005/0138110 A1 | * | 6/2005 | Redlich et al. | 709/201 |
| 2006/0218651 A1 | * | 9/2006 | Ginter et al. | 726/27 |
| 2007/0256117 A1 | * | 11/2007 | Shomo | 726/2 |

OTHER PUBLICATIONS

Bell, D. E., La Padula, L. J., "Secure Computer System: Unified Exposition and Multics Interpretation," The Mitre Corporation, Project No. 522B, Report No. ESD-TR-75-306, Mar. 1976.
Denning, D., "A Lattice Model of Secure Information Flow," Communications of ACM, 19 (5):236-243, May 1976.

(Continued)

*Primary Examiner* — Nirav B Patel
(74) *Attorney, Agent, or Firm* — William J. Stock, Esq.; F. Chau & Associates, LLC

(57) ABSTRACT

A method for protecting information in a distributed stream processing system, including: assigning a principal label to a processing component; assigning a first channel label to a first communication channel that is input to the processing component; comparing the principal label to the first channel label to determine if the processing component can read data attributes of the first channel label; and reading the data attributes of the first channel label when the principal label is equal to or has precedence over the first channel label, wherein the principal label includes a read label and a write label and at least one of a selection label, an addition label or a suppression label.

14 Claims, 6 Drawing Sheets

OTHER PUBLICATIONS

Ferraiolo, D. and Kuhn, R., "Role-Based Access Control," In 15th NIST-NSA National Computer Security Conference, Baltimore, MD, Oct. 1992.

Sandhu, R., "Lattice-Based Access Control Models," IEEE Computer, 26(11):9-19, 1993.

Sandhu, R., E. Coyne, H. Feinstein and C. Youman, "Role-Based Access Control Models," IEEE Computer, 29 (2), Feb. 1996.

Agrawal, R. and R. Srikant, "Privacy-Preserving Data Mining," In Proc. SIGMOD-97, 1997.

Myers, A. and B. Liskov, "Complete, Safe Information Flow with Decentralized Labels," Proceedings of the IEEE Symposium on Security and Privacy, May 1998, Oakland, California.

Sweeney, L., "k-Anonymity: A Model for Protecting Privacy," Int. J. Unceratin. Fuzziness Knowl.-Based Syst., 10(5):557-570, 2002.

Blythe, J., Deelman, E., Gil, Y., Kesselman, C., Agarwal, A., Mehta, G., Vahi, K., The Role of Planning in Grid Computing, ICAPS 2003.

Wu, D., Parsia, B., Sirin, E., Hendler, J. and Nau, D., "Automating DAML-S Web Services Composition Using SHOP2," In Proc. of ISWX2003, 2003.

Gil, Y., Deelman, E., Blythe, J., Kesselman, C. and Tangmunarunkit, H., "Artificial Intelligence and Grids: Workflow Planning and Beyond," IEEE Intelligent Systems, Jan. 2004.

Pistore, M., Traverso, P. and Bertoli, P., "Automated Composition of Web Services by Planning in Asynchronous Domains," In Proc. Of ISWC2003, 2003.

Riabov, A., Liu, Z., "Planning for Stream Processing Systems," AAAI 2005.

Brown, A., Keller, A. and Hellerstein, J., "A Model of Configuration Complexity and its Application to a Change Management System," In Proc. IM-05, 2005.

* cited by examiner

INPUT: Workflow graph $W = (V, E)$
$L_R(P), L_A(P), L_S(P), L_D(P), \forall$ classes $P$
Principal labels $L_R(v), L_w(v), \forall v \in V$ (can be $\emptyset$)
Channel labels $L(e), \forall e \in E$ (can be $\emptyset$)

OUTPUT: $L_R(v), L_w(v), L(e)$

1. For each edge $e = (u,v) \in E$ and $L(e) = \emptyset$
2.    If $L_w(u), \neq \emptyset$ let $L(e) := L_w(u)$
3.    If $L_R(v) \neq \emptyset$
4.      If $L(e) \not\preceq L_R(v)$ do REJECT
5.    End if
6. End for
7. For each comp. $p \in V$ of class $P$ and $L_w(p) = \emptyset$
8.    If $\forall e = (u,p) \in E \Rightarrow L(e) \neq \emptyset$
9.      Let $L_R(p) := \bigsqcup_{\forall e=(u,p) \in E} L(e)$
10.     If $L_R(p) \not\preceq L_R(P)$ do REJECT
11.     Let $L_S(p) := L_S(P) \downarrow L_R(p)$
12.     Let $L_w(p) := L_R(p) \sqcup L_S(p) \sqcup L_A(P) - L_D(P)$
13.    End if
14. End for
15. If $\exists v \in V : L_w(v) = \emptyset$ or $\exists e \in E : L(e) = \emptyset$ goto 1
15. ACCEPT

FIG. 5

ACCESS CONTROL METHOD AND A SYSTEM FOR PRIVACY PROTECTION

GOVERNMENT INTERESTS

This invention was made with Government support under Contract No.: TIA H98230-04-3-0001 awarded by Distillery Phase II Program. The Government has certain rights in this invention.

BACKGROUND OF THE INVENTION

1. Technical Field

The present invention relates to network security, and more particularly, to an access control method and a system for privacy protection.

2. Discussion of the Related Art

Privacy protection of personally identifiable information (PII) in information systems used in industry and government applications has become increasingly important due to the proliferation of computerized information and management systems. The work on privacy protection in computer systems that rely on databases and data mining algorithms for storing and processing information has largely focused on masking protected data at the point of retrieval, e.g., at the data source. In the area of information security protection, significant attention has focused on information flows between multiple principals.

The protection of PII involves two aspects: information security and privacy protection. Information security measures such as access control, firewalls, sandboxing and secure communication channels are used to prevent unauthorized access to PII. Information security measures alone are not enough for information systems to be privacy preserving since they are low level and do not distinguish between accessing PII for statistics computation or record retrieval. Privacy policies generally allow the former and prohibit the latter.

Existing privacy protection methods, such as privacy-preserving data mining, R. Agrawal and R. Srikant. Privacy-preserving data mining. In Proc. SIGMOD-97, 1997, define a formal framework for privacy analysis and protection. A common assumption in existing privacy protection methods is that its software, e.g., data mining software, can be trusted to protect private information. However, this is not always the case, especially when large systems are built using a large set of components that are open source or using commercial software developed by third parties.

Further, business circumstances often demand that the third party software be installed and running as soon as possible. However, there may not always be sufficient time to verify the code for potential security flaws or Trojan horses. One example of such an application where privacy constraints are important is the national airline passenger-prescreening program called Secure Flight that is currently being developed by the Transportation Security Administration (TSA) of the U.S. Department of Homeland Security, Secure Flight Program. U.S. Department of Homeland Security, Transportation Security Administration, http://www.tsa.gov/public/interapp/editorial/editorial_1716.xml.

Lattice-based access control (LBAC) models, such as those of Bell and LaPadula D. Bell and L. LaPadula. Secure computer system: Unified exposition and Multics interpretation. Technical Report ESD-TR-75-306, ESD/AFSC, Hanscom AFB, Bedford, Mass., 1975, and Denning D. Denning. A lattice model of secure information flow. Communications of the ACM, 19(5):236-243, May 1976, can provide formal end-to-end security guarantees in systems where the components are not trusted. These models are often overly restrictive. However, these issues can be address by modifications that permit declassification of data using trusted components, e.g., D. Bell. Secure computer systems: A refinement of the mathematical model. MTR-2547, Vol. III, MITRE Corp., 1974.

Tracking data integrity as data is transformed within stream processing systems is also important and can be addressed by the Biba integrity model as described, e.g., in, K. J. Biba. Integrity considerations for secure computer systems. Technical Report ESD-TR-76-372, ESD/AFSC, Hanscom AFB, Bedford, Mass., 1977.

The Bell-LaPadula policy is widely used in multi-level secure (MLS) systems. The models of Bell-LaPadula, Denning, Biba and several others can be unified under the common LBAC framework described by Sandhu, R. Sandhu. Lattice-based access control models. IEEE Computer, 26(11):9-19, 1993. Security and integrity models have been combined in practice, e.g., in the Caernarvon protocol H. Scherzer, R. Canetti, P. A. Karger, H. Krawczyk, T. Rabin, and D. C. Toll. Authenticating mandatory access controls and preserving privacy for a high-assurance smart card. In ESORICS, pages 181-200, 2003.

While the above-mentioned models are well suited for protection of confidentiality and integrity, they do not completely address the needs of privacy protection since they do not protect anonymity as well as confidentiality. For example, anonymity protection methods, such as k-anonymity, described in L. Sweeney. k-anonymity: a model for protecting privacy. Int. J. Uncertain. Fuzziness Knowl.-Based Syst., 10(5):557-570, 2002, are often parametric and provide varying degrees of protection depending on their configuration. In addition, selection, e.g., content-based filtering, may noticeably reduce anonymity, especially if it results in the disclosure of data derived from a significantly smaller population. Further, privacy policies mandate that different access decisions must be made for different access purposes; however, the notion of purpose is not supported by the LBAC models.

SUMMARY OF THE INVENTION

In an exemplary embodiment of the present invention, a method for protecting information in a distributed stream processing system, comprises: assigning a principal label to a processing component; assigning a first channel label to a first communication channel that is input to the processing component; comparing the principal label to the first channel label to determine if the processing component can read data attributes of the first channel label; and reading the data attributes of the first channel label when the principal label is equal to or has precedence over the first channel label, wherein the principal label includes a read label and a write label and at least one of a selection label, an addition label or a suppression label.

The principal label includes data attributes. The principal label includes a name and a risk level for each of the data attributes of the principal label. The principal label includes an integrity level for the data attributes of the principal label.

The first channel label includes a name and a risk level for each of the data attributes of the first channel label. The first channel label includes an integrity level for the data attributes of the first channel label. The first channel label further includes a processing history of the first communication channel.

The method further comprises: assigning a second channel label to a second communication channel that is output from the processing component; comparing the principal label to the second channel label to determine if data attributes of the principal label can be written to the second communication channel; and writing the data attributes of the principal label to the second communication channel when the second channel label is equal to or has precedence over the principal label.

The method further comprises: assigning a user label to a user that is connected to the second communication channel; comparing the user label to the second channel label to determine if the user can read data attributes of the second channel label; and reading the data attributes of the second channel label when the user label is equal to or has precedence over the second channel label.

The user label includes data attributes, the data attributes of the user label including a user name, a user role or a user purpose. The user label includes a read label.

In an exemplary embodiment of the present invention, a method for verifying privacy policy compliance of a workflow in a distributed stream processing system, comprises: assigning a read label to a user; assigning channel labels to channels connecting processing components of the workflow to external data sources; assigning read and write labels to the processing components; accepting the workflow when each of the read labels dominates the channel labels of all channels read by its corresponding processing component, each of the write labels is dominated by the channel labels of all channels written to by its corresponding processing component and each of the write labels dominates the read label of its corresponding processing component; or rejecting the workflow if each of the read labels does not dominate the channel labels of all the channels read by its corresponding processing component, each of the write labels is not dominated by the channel labels of all the channels written to by its corresponding processing component, each of the write labels does not dominate the read label of its corresponding processing component or if the user label does not dominate the channel labels of all channels read by the user, wherein the read label of the user, the channel labels of the channels and the read and write labels of the processing components include data attributes.

At least one of the channel labels is already assigned to at least one of the communication channels before the channel labels are assigned. At least one set of the read and write labels is already assigned to at least one of the processing components before the read and write labels are assigned.

The method further comprises: assigning a maximum read label to one of the processing components; and rejecting the workflow if the read label is not dominated by the maximum read label. The method further comprises: assigning an addition label to one of the processing components; and rejecting the workflow if the addition label is not dominated by the write label.

The method further comprises: assigning a selection label to one of the processing components; and rejecting the workflow if the selection label is not dominated by the write label. The method further comprises: assigning a suppression label to one of the processing components, wherein when the suppression label is assigned the write label dominates a minimum value of the suppression level and the read label.

The method further comprises: generating a planning task representation; reading the planning task representation using a planning algorithm; assigning the read label to the user, the channel labels to the channels and the read and write labels to the processing components using the planning algorithm; and generating the workflow by translating an output of the planning algorithm.

The method further comprises deploying the workflow when it is accepted. The method further comprises translating the read and write labels of the processing components into multi-level secure (MLS) system compatible labels, wherein the MLS system enforces a Bell-LaPadula privacy policy and the workflow is deployed in the MLS system.

In an exemplary embodiment of the present invention, a computer program product comprising a computer useable medium having computer program logic recorded thereon for protecting information in a distributed stream processing system, the computer program logic comprises: program code for assigning a principal label to a processing component; program code for assigning a first channel label to a first communication channel that is input to the processing component; program code for comparing the principal label to the first channel label to determine if the processing component can read data attributes of the first channel label; and program code for reading the data attributes of the first channel label when the principal label is equal to or has precedence over the first channel label, wherein the principal label includes a read label and a write label and at least one of a selection label, an addition label or a suppression label.

The computer program product, further comprises: program code for assigning a second channel label to a second communication channel this is output from the processing component; program code for comparing the principal label to the second channel label to determine if data attributes of the principal label can be written to the second communication channel; and program code for writing the data attributes of the principal label to the second communication channel when the second channel label is equal to or has precedence over the principal label.

The computer program product, further comprises: program code for assigning a user label to a user that is connected to the second communication channel; program code for comparing the user label to the second channel label to determine if the user can read data attributes of the second channel label; and program code for reading the data attributes of the second channel label when the user label is equal to or has precedence over the second channel label.

In an exemplary embodiment of the present invention, a computer program product comprising a computer useable medium having computer program logic recorded thereon for verifying privacy policy compliance of a workflow in a distributed stream processing system, the computer program logic comprises: program code for assigning a read label to a user; program code for assigning channel labels to channels connecting processing components of the workflow to external data sources; program code for assigning read and write labels to the processing components; program code for accepting the workflow when each of the read labels dominates the channel labels of all channels read by its corresponding processing component, each of the write labels is dominated by the channel labels of all channels written to by its corresponding processing component and each of the write labels dominates the read label of its corresponding processing component; or rejecting the workflow if each of the read labels does not dominate the channel labels of all the channels read by its corresponding processing component, each of the write labels is not dominated by the channel labels of all the channels written to by its corresponding processing component, each of the write labels does not dominate the read label of its corresponding processing component or if the user label does not dominate the channel labels of all channels read by the user, wherein the read label of the user, the channel labels of the channels and the read and write labels of the processing components include data attributes.

The computer program product, further comprises: program code for assigning a maximum read label to one of the processing components; and program code for rejecting the workflow if the read label is not dominated by the maximum read label. The computer program product, further comprises: program code for assigning an addition label to one of the processing components; and program code for rejecting the workflow if the addition label is not dominated by the write label.

The computer program product, further comprises: program code for assigning a selection label to one of the processing components; and program code for rejecting the workflow if the selection label is not dominated by the write label. The computer program product, further comprises: program code for assigning a suppression label to one of the processing components, wherein when the suppression label is assigned the write label dominates a minimum value of the suppression level and the read label.

The computer program product, further comprises: program code for generating a planning task representation; program code for reading the planning task representation using a planning algorithm; program code for assigning the read label to the user, the channel labels to the channels and the read and write labels to the processing components using the planning algorithm; and program code for generating the workflow by translating an output of the planning algorithm.

The computer program product, further comprises program code for deploying the workflow when it is accepted. The computer program product, further comprises program code for translating the read and write labels of the processing components into MLS system compatible labels, wherein the MLS system enforces a Bell-LaPadula privacy policy.

In an exemplary embodiment of the present invention, a workflow deployment unit for protecting personally identifiable information (PII) in a distributed stream processing system, comprises: an assigner for assigning principal labels to processing components, channel labels to communication channels, and a user label to a user; a verifier for verifying that the channel label of a communication channel that is input to a processing component can be read by the processing component, for verifying that the principal label of a processing component can be written to by the processing component to a communication channel that is output from the processing component and for verifying that the user label can be read by the channel label of the communication channel this is output from the processing component; and a deployer for deploying a workflow that includes the processing component that can read the channel label of the communication channel that is input to the processing component and that can write the principal label to the communication channel that is output from the processing component, the communication channel that is input to the processing component, the communication channel that is output from the processing component and the user that can read the channel label of the communication channel that is output from the processing component.

The principal labels and the channel labels include PII. The workflow deployment unit further comprises: a first interface for receiving PII; and a second interface for receiving the principal labels, the channel labels and the user label.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 5 illustrates a label assignment algorithm according to an exemplary embodiment of the present invention.

DETAILED DESCRIPTION OF EXEMPLARY EMBODIMENTS

Figure 1:
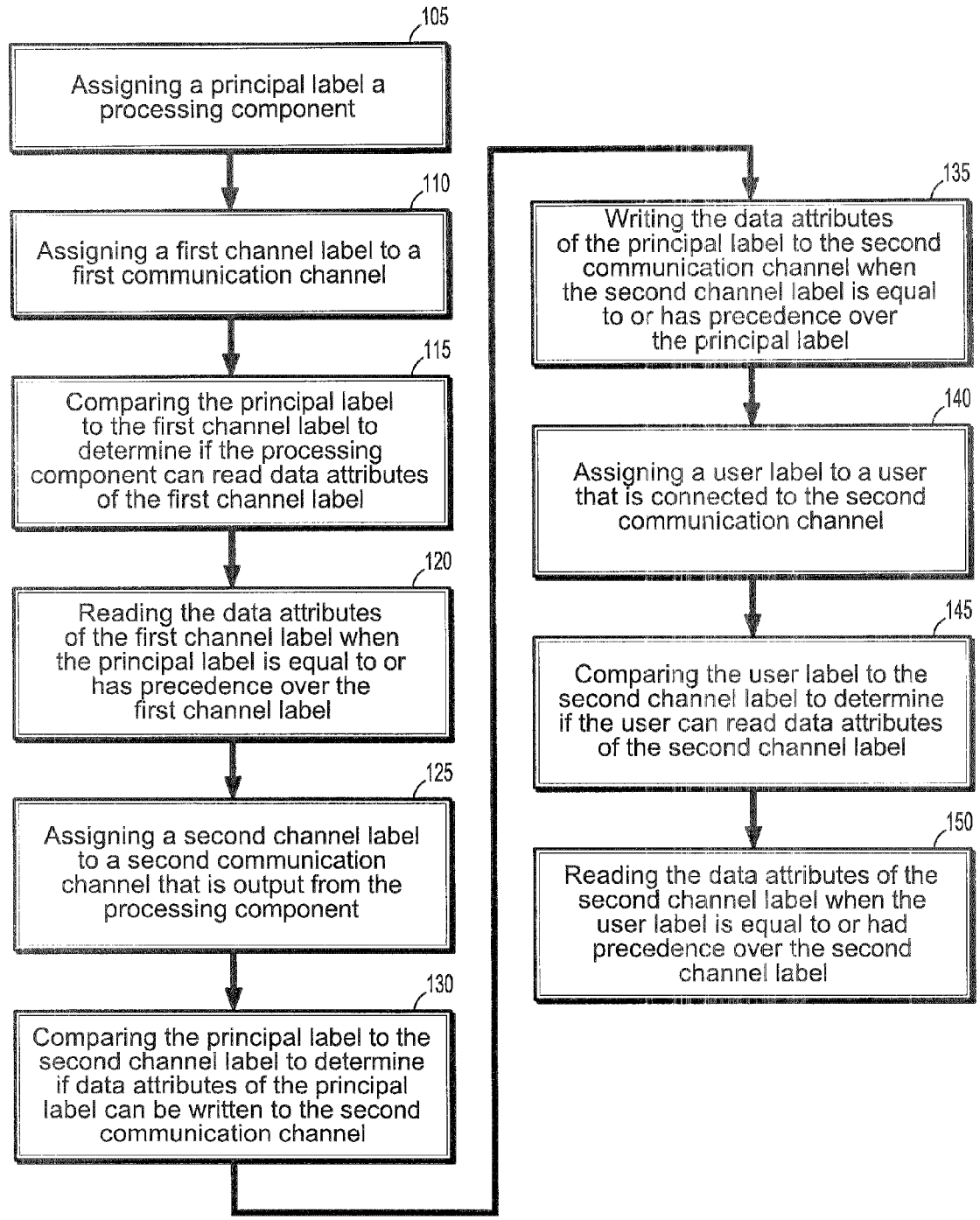
FIG. 1 illustrates a method for protecting data in a distributed stream processing system according to an exemplary embodiment of the present invention.

An access control method and a system for privacy protection according to an exemplary embodiment of the present invention will now be described beginning first with a general stream processing system followed by a multi-set attribute (MSA) privacy model of the privacy protection framework.

General Model of Stream Processing. Consider a general model of a stream processing system in which data streams are processed by one or more components (e.g., principals). The components are connected by communication channels (e.g., objects). The communication channels also connect the components to external data sources and to sinks thus delivering information to a user. The communication channels are one-way links allowing the data stream to flow from its source to its destination. To simplify verification, it is assumed that a resulting information flow graph is acyclic.

A set of communicating components connected by communication channels is referred to as workflows or information flow graphs. There are three categories of nodes in the workflow. Nodes that have no incoming edges are referred to as source nodes. Nodes that have no outgoing edges are referred to as sink nodes. The rest of the nodes are referred to as processing components or components. Generally, source nodes represent the data sources (e.g., databases or data streams) from which the data arrives in the system. A sink node typically represents an end user who receives results of the processing. Processing components are programs that transform data, producing new data streams from the data they receive.

In the privacy protection framework, labels are assigned to the communication channels and to the processing components. The labels describe data attributes present in channels or accessed by components. The components are treated as principals, and may or may not be trusted. A channel label is chosen and assigned such that is can correctly reflect both the content and processing history (e.g., selection and suppression) of information passing through the channel. An access decision is made by comparing a label assigned to an output channel and a label of a user according to a role of the user and a user's access purpose.

Channel labels and principal labels will now be described in more detail.

Channel Label. A privacy policy in the MSA model provides a description of a set of categories of information that must be protected, e.g., taxpayer identifier, salary amount or bank account number. These categories are referred to as attributes, to distinguish from coarser security models and to better reflect operations on the data, such as selection. If a channel carries information belonging to a category, the channel is said to contain that attribute. For example, if a channel can carry a document containing the following sentence: "Alice's salary of $XXXX is directly deposited to her bank account YYYYYY", the label of the channel must contain both salary and bank account attributes.

There is a significant difference between the notion of attributes in the MSA model and of attributes in relational databases. In particular, the channels in the MSA model can carry unstructured data.

A channel o in the MSA model is assigned a label L(o). In the following, when the context is clear, L(o) is written as L. A channel label describes the attributes contained in the channel, as well as a processing history of the channel. A label L has two elements: an attribute set A and an integrity level t, e.g., L=(A,t). For notational convenience, L.A and L.t is used to denote these two elements, respectively.

Attribute set A includes a pair of (attribute-name, risk-level) for each attribute contained in the channel. Typically, $A=\{(att_1,r_1), \ldots ,(att_n,r_n)\}$ where $att_i$ is the name of attribute i and $r_i$ ($0 \leq r_i \leq 1$) is a corresponding risk level. In the following, denote $Attr(L.A)=Attr(L)=\{att_1, \ldots ,att_n\}$. The risk level $r_i$ represents the risk of disclosing information corresponding to the attribute $att_i$ if the contents of the channel collected over a fixed time are disclosed. For example, a risk level of 1 means that the attribute is explicitly present in the channel, and a risk level of 0 means that it is impossible to derive the value of the attribute from the channel. In the following, practical issues of risk evaluation will be addressed. Generally, an attribute with the risk level of 0 can be omitted from the labels.

The integrity level L.t is an integer between 1 and T, where T is the highest level of integrity specified in the privacy policy. Information from a channel with a higher t is considered more accurate, reliable and trustworthy than that from a channel with a lower t, as described, e.g., in K. J. Biba. Integrity considerations for secure computer systems. Technical Report ESD-TR-76-372, ESD/AFSC, Hanscom AFB, Bedford, Mass., 1977.

A low integrity level corresponds to either potentially damaging data (e.g., data containing a virus), or to data that may be misleading or unreliable. L(o).t is determined by the labels of a principal that writes to a channel, or it is determined based on processing history.

Principal Label. Each principal P is assigned the following labels: a read label $L_R(p)$, a write label $L_W(p)$, a selection label $L_S(p)$, an addition label $L_A(p)$, and a suppression (or downgrading) label $L_D(p)$. $L_R$ determines which channels can be read by a principal, and $L_W$ controls labels of channels written by the principal. The selection label $L_S$ is used to record in the processing history of a channel selection operations that have been performed by the principal. In particular, if a principal conducts a selection based on an attribute att, it is required that (att-selected, 1) $\in L_S.A$, where att-selected is a new attribute representing that att has been selected. The access control rules to be described below guarantee that the selection history is recorded when information is transmitted throughout the workflow graph. The addition label $L_A$ includes the attributes that are added to output data by the principal. Finally, the suppression label $L_D$ describes the attributes that are suppressed by the principal.

Access Rules. Before access control rules of the MSA model are presented, notations used to describe the rules will be introduced.

Definition 1. Given two attribute sets A and A', $A \preceq A'$ if and only if $\forall (att,r) \in A$, $\exists (att',r') \in A'$ such that att=att' and $r \leq r'$.

To remain consistent with notations in existing security models, A' dominates A if and only if $A \preceq A'$. Informally, $A \preceq A'$ means that attribute set A' contains more sensitive information than A. Definition 1 can be extended to compare two labels as follows.

Definition 2. Given two labels L=<A,t> and L'=<A,t'>, $L \preceq L'$ if and only if $A \preceq A'$ and $t \geq t'$.

Since a lower integrity level indicates a lower trustworthiness of the label assigned to the information, $L \preceq L'$ means that label L' represents more sensitive information than L. It is easy to show that $\preceq$ is a partial order (e.g., reflexive, transitive and antisymmetric). Since $\preceq$ is not a total order, there may exist two labels that are not comparable. Use $L \not\preceq L'$ to denote the fact that (1) L and L' are not comparable, or (2) $(L' \preceq L) \wedge (L \neq L')$.

Definition 3. Given two labels L=<A,t> and L'=<A',t'>, $A \sqcup A' = \{(att, \max\{r_{att}^A, r_{att}^{A'}\})\}$ for $\forall att \in Attr(A) \cup Attr(A')$ where $r_{att}^A$ and $r_{att}^{A'}$ are the risk levels of att in A and A' respectively. Consequently, $L \sqcup L'$ is defined as $L \sqcup L' = <A \sqcup A', \min\{t,t'\}>$.

Recall that if $att \notin Attr(A)$, $r_{att}^A=0$. Intuitively, $L \sqcup L$ represents the union of the attributes annotated by L and L'. The following result is straightforward: $(L_1 \preceq L) \wedge (L_2 \preceq L) \Leftrightarrow (L_1 \sqcup L_2) \preceq L$.

Definition 4. Given two labels L=<A,t> and L'=<A',t'>, define $A-A' = \{(att', \min\{r_{att'}^A, r_{att'}^{A'}\})\} \cup \{(att, r_{att})\}$ for $\forall att' \in Attr(A) \cap Attr(A')$ and $\forall att \in Attr(A) \backslash Attr(A')$.

Consequently, L−L' is defined as $L-L'=<A-A', \min\{t,t'\}>$. Under this definition, A−A' includes the pair of $(att, r_{att})$ if att is contained in A but not A'. If att is contained in both A and A', att is also included in A−A' and its risk level is the minimum of the risk levels of att in A and A' respectively.

The access control rules of the MSA model are described below.

Rule 1. Read access. A principal can read a channel o with label L(o) from an incoming link only if $L(o) \preceq L_R$. (1)

Hence, a principal can read channels that contain at most as much sensitive information as represented by the principal's read label. Recall that $L(o)=<A_o,t_o> \preceq <A_R,t_R> = L_R \Rightarrow t_o \geq t_R$. The integrity level $t_R$ of $L_R$ can be used to restrict allowed input of the principal to channels with integrity at or above a specified level ($t_R$).

Rule 2. Write access. The label L(o') of a channel o' written to an outgoing link must satisfy $L_W \preceq L(o')$. (2)

This rule specifies that the channel written by the principal contains all the attributes that are represented by the write label $L_W$, and L(o'). $t \leq L_W.t$. Thus, the label of a channel written by a principal with a low integrity level has the same or lower integrity level, which disallows read access to the channel for other principals with high input integrity requirements. Consequently, access to the channels produced by low-integrity principals can be restricted, and potential privacy violations due to label uncertainty can be avoided.

Rule 3. Attribute accumulation. For untrusted principals the following inequality must hold: $L_R \sqcup L_S \sqcup L_A \preceq L_W$. (3)

Hence, the channels written by the principal will have a risk level for each of the attributes that is equal to or exceeding the risk level of the same attribute in any of the inputs or selection and addition labels. It is clear that $(L_R \sqcup L_S \sqcup L_A \preceq L_W) \Rightarrow (L_R \preceq L_W) \wedge (L_S \preceq L_W) \wedge (L_A \preceq L_W)$. Since $\preceq$ is transitive, $(L(o) \preceq L_R) \wedge (L_W \preceq L(o')) \Rightarrow (L(o) \preceq L(o'))$, which means that, for an untrusted principal, all attributes contained in the label of a channel read by the principal must be contained in the labels of all channels written by the principal, with the same or higher risk level. Condition $L_S \preceq L_W \preceq L(o')$ guarantees that if the principal performs a selection based on attribute att, label $L(o')$ includes the pair of (att-selected, 1) thus recording the selection operation in the processing history of the information.

Additionally, $L_A \preceq L_W \preceq L(o')$ ensures that $L(o')$ contains the attributes added by the principal. Note that $L(o')$.t $\leq L_W$.t $\leq \min\{L_R.t, L_S.t, L_A.t\}$, hence the integrity level of the label of a channel written by a principal is no larger than the minimum of the integrity levels of the principal's labels.

Rule 4. Suppression. For trusted principals, suppression operations are described by defining a nonempty suppression label $L_D$. The condition (3) above is then adjusted to allow suppression of the attributes: $L_R \sqcup L_S \sqcup L_A - L_D \preceq L_W$. (4)

When this rule is applied, all implications of rule 3 hold for all attributes, with the exception of the suppressed attributes contained in $L_D$. The suppressed attributes in $L_W$ can have a maximum risk level equal to or higher than the risk level specified for the attribute in the suppression label of the principal. Hence, the trusted principals can reduce risk levels of one or several attributes, effectively labeling the channels that they write as less sensitive than the channels that they read. Note that since $\preceq$ is a partial order, the information flow represented by a workflow graph is similar to the Denning's lattice model. Once the four access control rules described above hold and are enforced, the MSA model can guarantee privacy policy compliance.

Now that the general stream processing system and the MSA privacy model have been described, a method for protecting information such as personally identifiable information (PII) using the MSA control model in a general stream processing system will be described with reference to FIG. 1.

As shown in FIG. 1, a principal label is assigned to a processing component (105) and a first channel label is assigned to a first communication channel (110). The principal label is compared to the first channel label to determine if the processing component can read data attributes of the first channel label (115). If the principal label is equal to or has precedence over the first channel label, the data attributes of the first channel label are read by the processing component (120). For example, if a channel label $L_W$ contains attribute "SSN" with risk level 0.8, and attribute "Name" with risk level 0.6, and a principal label $L_R$ contains attribute "SNN" with risk level 1.0, and attribute "Name" with risk level 1.0, the principal is allowed read access to the channel.

A second channel label is assigned to a second communication channel that is output from the processing component (125). The principal label is compared to the second channel label to determine if data attributes of the principal label can be written to the second communication channel (130). If the second channel label is equal to or has precedence over the principal label, the data attributes of the principal label are written to the second communication channel (135).

A user label is assigned to a user that is connected to the second communication channel (140). The user label is compared to the second channel label to determine if the user can read data attributes of the second channel label (145). If the user label is equal to or has precedence over the second channel label, the data attributes of the second channel label are read by the user label (150).

Figure 2:
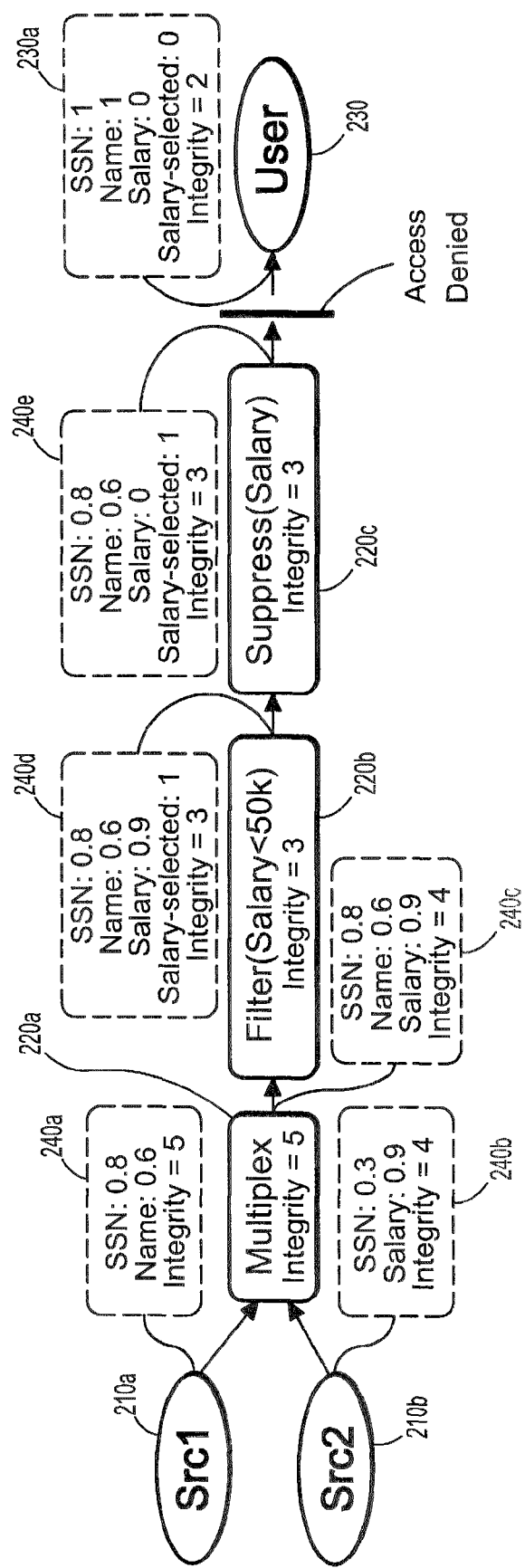
FIG. 2 illustrates controlling access to a stream of data according to an exemplary embodiment of the present invention.

FIG. 2 is an example of controlling access to a stream of data according to an exemplary embodiment of the present invention. FIG. 2 shows data sources 210a-b connected to processing components 220a-c via channels (indicated by arrows) that have labels 240a-e assigned thereto and a user 230. The user 230 has a read label 230a assigned thereto. In this example user read access to the channel label 240e is denied (by applying the method of FIG. 1) since the read label 230a does not dominate the channel label 240e. A suppressor in the processing component 220c can be used to reduce the risk level of attributes and selection labels shown in labels 240d-e can add new attributes indicating that a selection has been performed.

The following description will focus on how the MSA model can be used for proving policy compliance.

Privacy Policy Compliance Properties. Note that if channel labels correctly reflect privacy sensitivity of the channels, principal labels can provide a flexible way of describing the trust placed in the principals. Depending on the degree of trust, the sensitivity and integrity of input information can be limited as needed by specifying appropriate read labels LR. The constraints and read labels directly represent the access permissions provided by the policy. However, to prove that the entire system of principals and channels complies with the policy when the access control rules are satisfied, it must be shown that the channel labels correctly annotate channel content.

What follows is the definition of correctness.

Definition 5. A channel label is correct if it contains all the attributes contained in the channel, and the risk level corresponding to the attribute in the label is equal to or higher than a privacy risk measure of the channel with respect to the attribute. For example, each attribute contained in the channel is included in the label with an appropriate risk level, and selection operations performed using any attribute of the channel according to selection criteria are recorded in the label.

This definition implies that once a label includes a pair of (att, 1), attribute att of the channel is correctly reflected by the label, independent of actual channel content. There are two scenarios of how incorrect labels can occur. First, a channel implicitly or explicitly can contain an attribute att while there are no pairs of (att,) in the label of the channel. Second, the pair of (att, r) appears in the label, but the measure of risk that att can be inferred based on the channel is higher than r.

In the absence of suppression and addition, e.g., when $Ln.A=L_A.A=\emptyset$, the attribute accumulation rule (3) ensures that all attributes contained in the channels read by the principal are preserved and appear in the label of every channel written by the principal. In this case, assuming that the input channel labels are correct, the labels of the channels written by the principal are also correct since no new attributes are introduced by the principal and the output label dominates the input label. In the case when a principal adds a new attribute att to the channels it writes, the policy requires that for this principal (att, 1) $\in L_A.A$. Therefore, rule (3) guarantees that (att, 1) $\in L(o')$. A, and hence, att is correctly reflected in the label L' of each channel written to by the principal.

To ensure that the label correctly reflects a selection performed on attribute att, the pair of (att-selected, 1) must be included in $L_S.A$. Rule (3) then guarantees that this selection operation is reflected by the labels of the channels written by the principal performing selection. When suppression is performed by trusted principals, rule (4) makes sure that any attribute that is not suppressed is correctly reflected in label L(o') of each channel o' written by the principal. For those attributes that are suppressed, it is assumed that the principal correctly reduces the risk level of the corresponding attribute since the principal is trusted to perform a suppression operation on all channels that satisfy the input requirements of the principal, and whose labels are dominated by the principal's read label.

Rule (3) describes label computation at the level of a single principal. In the following, however, it will be shown that as a whole the system of principals and channels, in which MSA access control rules are enforced, achieves privacy policy compliance. Consider the following two cases. In the first case, there are no trusted principals performing suppression in the information flow graph. In second case, there exists a principal that suppresses one or more attributes. For simplicity, attribute att will be the focus. The second case can trivially be extended for multiple attributes.

Before moving on, the following notation will be introduced.

Definition 6. A path $\Phi_{p1,pn}$ from principal $p_1$ to principal $p_n$ is a sequence of principals $(p_1, p_2, \ldots, p_{n-1}, p_n)$ such that there exists a directed edge in the information flow graph from $p_i$ to $p_{i+1}$ for each i=1.2, ... n−1. Principals on the path $\Phi_{p1,pn}$ are referred to as predecessors of $p_n$ on $\Phi_{p1,pn}$.

In the case where there are no principals performing suppression in the information flow graph, the following proposition stands.

Proposition 1. Let $L(o_p)$ be the label of a channel $o_p$ written by principal p. Without suppression, $L(o_{p'}) \preccurlyeq L(o_p)$ for any predecessor p' of p.

Proposition 2. If $L(o_p)$ is the label of a channel $o_p$ written by a principal p, such that att-selected $\in$ Attr($L(o_p)$)), then there are no predecessors of p on any path to p that perform selection based on attribute att.

Proposition (2) states that once a selection on att is performed, att-selected is always included in the label when the information is transmitted through the workflow graph.

When suppression is performed by one of the principals in the information flow graph, one has the following result.

Proposition 3. Once attribute att is selected, even when att is suppressed later, the channel label still includes att-selected, indicating that the stream has been selected based on att.

Thus, the MSA model can apply different access control rules in cases when the suppression of att is performed with or without prior selection of att. When att is pre-selected the channel should be considered more sensitive with respect to the attribute att.

Workflow Planning. When formulating a workflow planning problem, workflow composition formalism of the Stream Processing Planning Language (SPPL) described in A. Riabov and Z. Liu. Planning for stream processing systems, In Proc. of AAAI-05, 2005, was used.

An example of a workflow-planning problem will now be described with reference to FIGS. 3A and 3B. Here, consider a marketing research department of a company that analyzes conversations within an Internet chatroom hosted by the company for the purpose of studying opinions about products. The analysis is performed by a stream processing system in real time. Privacy policy requires that no information entered by a child under 13 can be analyzed or stored, irrespective of purpose. Chatroom conversations may be stored and analyzed for research purposes, as long as the conversations are not associated with the names of the persons participating, and unless customers "opt-out", e.g., request that their conversations be excluded.

Figure 3A:
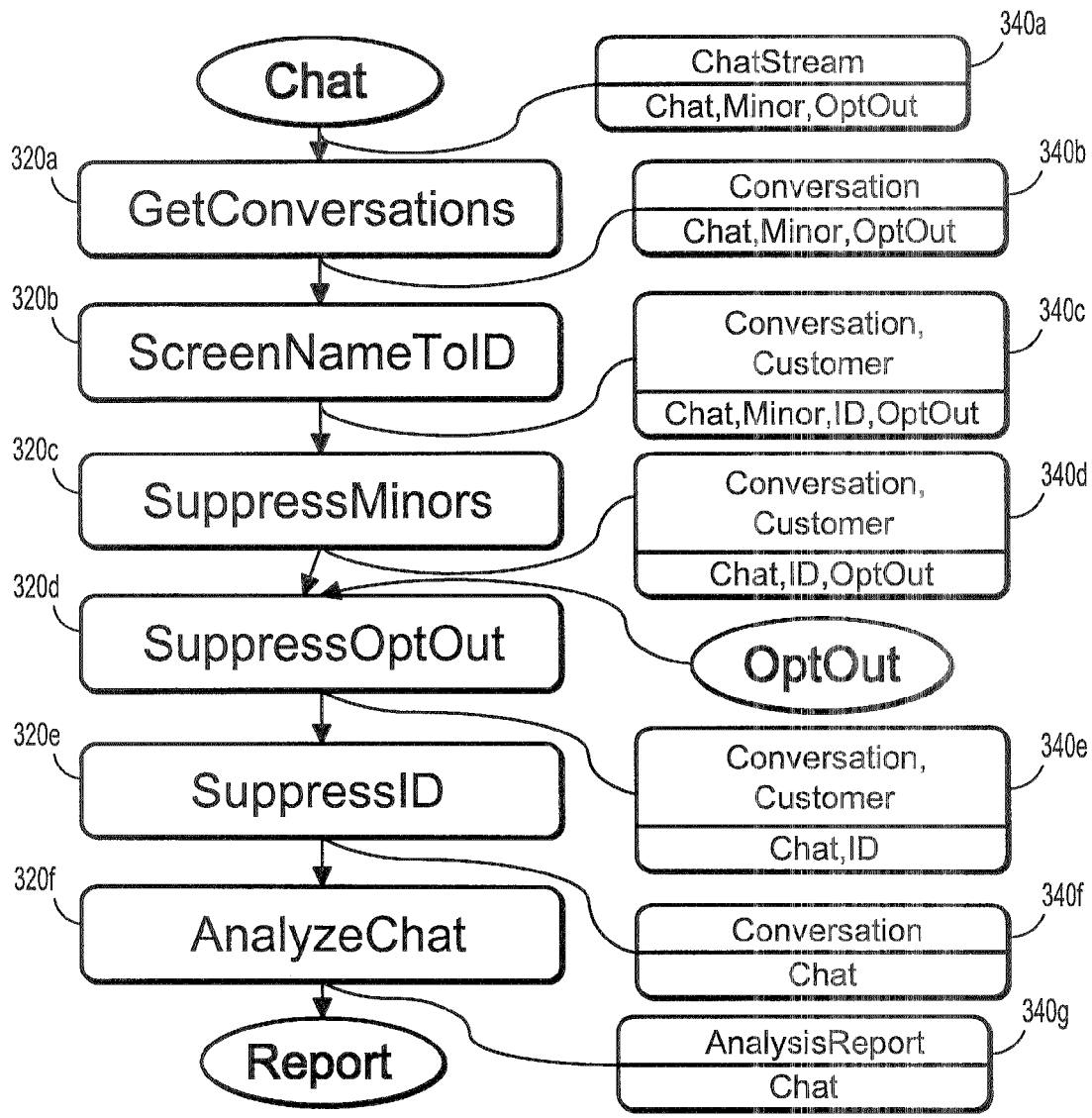
FIG. 3A illustrates a workflow generated with privacy constraints according to an exemplary embodiment of the present invention.
Figure 3B:
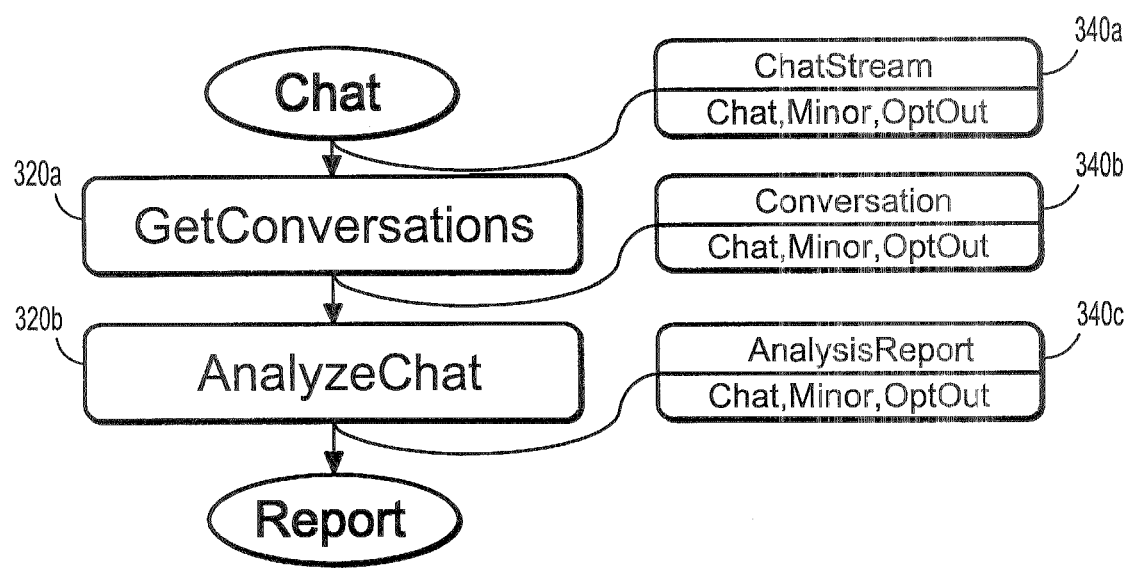
FIG. 3B illustrates a workflow generated without privacy constraints according to an exemplary embodiment of the present invention.

In FIGS. 3A and 3B, the components are shown as rectangles 320a-f and 320a-b connected by streams (indicated by arrows), and for each stream, a label 340a-g and 340a-c with corresponding data types and privacy attributes is shown. The workflow in FIG. 3A is generated if the MSA privacy policy is enforced. In the absence of privacy constraints, intermediate steps between GetConversations 320a and AnalyzeChat 320f components of FIG. 3A will be automatically removed, since they would become unnecessary. FIG. 3B shows the workflow in the absence of privacy constraints.

Note that a component called ScreenNameToID 320b was included in the workflow shown in FIG. 3A only because an ID type is required by subsequent suppressors. This type corresponds to a user identifier that is needed to access user properties, such as age and opt-out flag. In general, SPPL planners can create workflow directed acyclic graphs (DAGs) of higher complexity than shown in this example. A general approach will now be described.

SPPL. The SPPL model describes the components of a stream processing workflow as actions that can have preconditions and effects. Streams in this model are described by predicates that can correspond to the type, format, and security or privacy attributes of data passing through the stream. Primal streams must be described as completely as possible based on the available knowledge about the external data sources. The descriptions of the derived streams, e.g., the streams produced by a component, are computed based on the descriptions of the component and of the streams processed by the component. Hence, the description of the output stream can be computed recursively.

In the privacy protection framework, consider a simplification of the SPPL model in which predicates are restricted to ground formulas and only AND-logic for predicate propagation is used. In this model, each data stream is described by a set x=(x.t, x.s). The subset x.t describes the format and type of data carried by the stream, and the subset x.s represents the privacy label of the data, as will now be described.

Each component is represented by an SPPL action $c \in \hat{A}$, where $\hat{A}$ is the set of all actions and c is defined by: 1) a precondition set $p_j(c)$ for each input port j, $1 \leq i \leq J(c)$; 2) an add-effect set $a_k(c)$ and a delete-effect set $d_k(c)$, where $a_k(c) \cap d_k(c) = \emptyset$, for each output port k, k, $1 \leq k \leq K$ (c); 3) two real numbers for resource cost r(c) and quality q(c) contribution of the component to the cost and quality of the workflow.

The initial state for workflow planning is defined as a set of primal streams, $S^0 := \{x_1^0 : x_2^0, \ldots, x_I^0\}$. An action C can be applied in a state S if there exist streams $x_1, \ldots, x_{J(c)} \in S$ such that $p_j(c) \subseteq x_j$.

When action c is applied, a transition is made to a new state $S' = S \odot c$ defined as:

$$S' := S \cup \bigcup_{k=1}^{K} \left\{ \left( a_k(c) \cdot t, \left[ a_k(c) \cdot s \cup \bigcap_{j=1}^{J} x_j \cdot s \right] \setminus d_k(c) \cdot s \right) \right\}$$

In state S', K(c) new streams are created. The new streams have type and format defined by the corresponding output ports of c, and have a privacy-related set equal to the intersection of input privacy-related sets, possibly affected by port-specific additions and deletions.

Given a goal set g, the planning problem $P(S^0, \hat{A}, B, g)$ is to find a set of actions that leads to a state S* in which there exists a stream $x \in S^*$ such that $g \subseteq x$, and such that the sum of quality values of the actions is maximized, and the sum of resource costs is less than a cost budget B.

Privacy Planning Domain. A basic procedure that can be used to generate action descriptions for components taking into account the labels $L_R$, $L_S$, $L_A$ and $L_D$ will now be described. A similar approach is used to generate goal and primal stream descriptions based on the write labels of the sources and the read label of the user. This procedure will ensure that the workflows generated by an SPPL planner will comply with the MSA policy.

Universal Attribute Set. A universal set $\mathcal{U}$ of all privacy predicates is defined as follows. The set is defined using the values of risk and integrity that appear in the labels used in describing components, primal streams or users. Since there is a limited number of these labels, the size of $\mathcal{U}$ is polynomial in the number of components and privacy attributes. For each value of integrity level t, set U includes the element int_atleast (t). For each attribute-risk (att, r) pair used in the labels, set $\mathcal{U}$ includes the element no_att(att, r).

Initial State. The primal streams have write labels, which are represented as initial state vectors. Given $L_W$, the corresponding set x.s describing one of the initial state streams is:

$$x.s := \{\text{int\_atleast}(t) \in \mathcal{U} | t \leq L_W.t\} \cup \{\text{no\_att}(att, r) \in \mathcal{U} | \exists (att, r') \in L_W.A, r' < r\} \cup \{\text{no\_att}(att, r) \in \mathcal{U} | \exists (att, r) \in L_W.A, \forall r'\}$$

Preconditions and Goals. The read labels assigned to components are translated into preconditions, and the read label of the user is translated into the goal using the following formula:

$$p.s := \{\text{int\_atleast}(L_R.t)\} \cup \{\text{no\_att}(att, r) \in \mathcal{U} | \exists (att, r') \in L_R.A, r' < r\}$$

Effects. The addition and the selection labels $L_A$ and $L_S$ are translated into delete-effects, while the suppression labels $L_D$ are translated into add-effects:

$$d.s := \{\text{int\_atleast}(t) \in \mathcal{U} | t > \min\{L_A.t, L_S.t\}\} \cup \{\text{no\_att}(att, r) \in \mathcal{U} | \exists (att, r') \in L_A.A \cup L_S.A, r' \geq r\}:$$

$$a.s := \{\text{int\_atleast}(t) \in \mathcal{U} | t \leq L_D.t\} \cup \{\text{no\_att}(att, r) \in \mathcal{U} | \exists (att, r') \in L_D.A, r' > r\}:$$

It is straightforward to show that if this procedure is followed, any solution to the planning problem $P(S^0, \hat{A}^-, B, g)$ satisfies the constraints of the MSA policy.

Efficiency Planning Algorithms. In terms of efficiency, the SPPL planning algorithm described in A. Riabov and Z. Liu. Planning for stream processing systems, In Proc. of AAAI-05, 2005, shows excellent performance on benchmark problems, composing large workflows of 500 components in 60 seconds. In a worst case, however, the planning problem $P(S^0, \hat{A}^-, B, g)$ is an extension of the propositional STRIPS planning formulation, which is PSPACE-complete. It is desirable, therefore, to identify special classes of planning problems that are tractable in practice.

It will now be shown that certain simplifying assumptions guarantee that the workflow planning problem is always tractable. First, assume that there are no resource cost budget constraints and no quality optimization objectives. In practice, these constraints can often be handled separately by alternative methods. Second, assume that action preconditions can only contain non-propagating predicates. Under these assumptions, the problem is in NP.

Proposition 4. The planning problem $P(S^0, \hat{A}, g)$ without resource and quality constraints is NP-complete.

Although this problem is NP-complete if the use of suppressors is allowed, if the suppression labels LD are ordered the problem can be solved in polynomial time.

Proposition 5. If all non-empty suppression labels $L_D$ are ordered, e.g., $L_D^1 \preceq L_D^2 \preceq \ldots \preceq L_D^d$, the planning problem $P(S^0, \hat{A}, g)$ without resource and quality constraints can be solved in $O(|\hat{A}|^2 d)$ operations.

From this result, polynomial algorithms can be derived for other cases. One example is the case where labels are ordered, that is, if labels are one-dimensional, e.g., contain a single attribute (possibly, with different risk levels) and have equal integrity levels. Similarly, in systems where there are no suppressors the same algorithm solves the planning problem in $O(|\hat{A}|^2)$ operations. When the assumption of Proposition 5 does not hold, a general search method, such as branch-and-bound, can be employed for solving the problem. In this case, the polynomial algorithm of Proposition 5 can be used to compute bounds and speedup the search.

MLS-based Implementation. Practical issues of implementing MSA-compliant systems and the general system architecture and procedures that are required for policy compliance enforcement will now be described.

Figure 4:
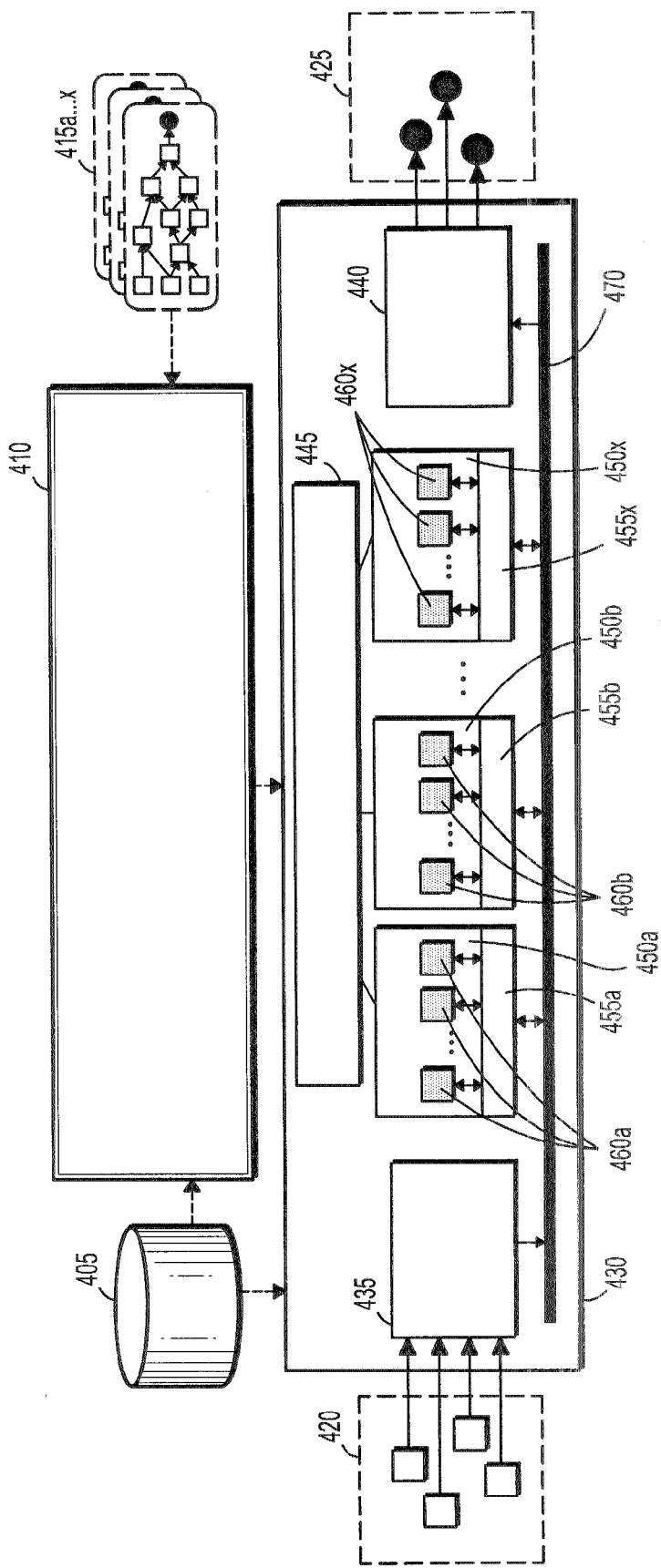
FIG. 4 illustrates a system for workflow verification and deployment according to an exemplary embodiment of the present invention.

Example architecture of an MSA-complaint system is shown in FIG. 4. In this architecture the requirement for automatic workflow verification is addressed by including a workflow deployment interface 410 that is coupled to a privacy metadata database 405 and which performs necessary analysis and verification of workflows 415a . . . x before deployment. In other words, the workflow interface 410 ensures that PII is protected Privacy architecture also extends a system runtime environment 430 by inserting a number of trusted enforcement components 460a . . . x, which are used to ensure that the description of the workflow analyzed before deployment correctly reflects the information flow in runtime.

The system runtime 430 is a distributed system, which consists of one or more computers 450a . . . x, a data interface 435 and a results interface 440 connected via a network 470. Sources 420 are connected to the data interface 435 and sinks 425 are connected to the results interface 440. Each of the computers 450a . . . x runs one or more operating systems and may have trusted I/Os 455a . . . x. Local operating systems can host components, either directly, or using compositional framework software. Workflows 415a . . . x are submitted to a global scheduler 445 for deployment, and the scheduler 445 allocates components to operating systems and manages allocation of resources in runtime.

Before a workflow 415a . . . x is sent to the scheduler 445 for deployment, it is verified for policy compliance by using the method of FIG. 1 and/or variations of the method of FIG. 1 as will be described hereinafter with reference to FIG. 5. If a privacy violation is detected, the workflow graph is rejected; otherwise, the workflow 415a . . . x is sent to the scheduler 445, which will deploy it, provided that there are sufficient resources available. During verification of the workflow 415a . . . x, the system may have a choice of labels assigned to the components 460a . . . x. This is because the least sensitive information can be labeled as most sensitive without incurring violation of the policy. However this also means that access to that information will be restricted. Therefore, minimal write labels are assigned, so that read labels can also remain low while satisfying inequalities (rules (1), (2), (3) and (4)).

In runtime, the privacy enforcement architecture must ensure that no communication between the components takes place except those specified in the workflow graph. Further, it must verify correctness of the write labels assigned to the nodes of the workflow 415a . . . x, especially when components 460a . . . x are not trusted. This can be achieved by selectively logging and auditing the dataflow between the components 460a . . . x, since full analysis of all data can be infeasible because of significant resource requirements. Finally, each workflow 415a . . . x must be logged and later audited to manage the risk of users obtaining privacy-sensitive information through submitting a combination of multiple workflows.

In sum, the privacy architecture provides functionality spanning entire lifetime of the workflow as follows: 1) workflow verification before deployment; 2) runtime privacy policy enforcement during execution; and 3) auditing of data, components and workflows during and after execution.

Details of modules comprising the privacy architecture will now be described, starting with metadata for specifying policy and policy parameters, followed by a detailed description of verification, runtime enforcement and auditing.

Privacy Policy Metadata. Descriptions of attributes, components, sources and sinks are direct reflections of the privacy policy. Changing any of these descriptions is equivalent to changing the policy, and therefore the metadata must be protected by access control measures.

Role, Purpose and Read Labels. Access rules based on information categories have been extensively studied in existing security models, and the read label together with rule (1) follows these approaches by specifying the principal label that must dominate the label of all accessible channels.

However, in practice, privacy policy rules are commonly specified as combinations of information categories and allowed purposes of access. Therefore, in the implementation of the MSA-compliant system the rules can be specified in a more natural format. The work on role-based access control (RBAC) models, such as those described in D. Ferraiolo and D. Kuhn. Role-based access controls. In 15th NIST-NSA National Computer Security Conference, Baltimore, Md., October 1992. R. Sandhu and E. Coyne. Role-based access control models. IEEE Computer, 29(2), February 1996, has shown that RBAC can reduce the complexity and cost of security administration.

RBAC fits naturally in the privacy framework, and a similar approach can be used to specify privacy policy rules instead of specifying read labels for every node.

Combining principals' roles and purposes, the privacy policy defines a mapping F that determines the read label LR(p) for each principal p based on the role and current purpose of the principal, e.g., $L_R(p)=F(role(p), purpose(p))$.

In practice, the mapping F can be implemented as table look-up. Assuming privacy policy metadata contains this table, specifying role and purpose for a principal is equivalent to specifying a read label.

Sources. Metadata for each of the data sources contains a single write label $L_W$ that describes the set of attributes and integrity of the information arriving from this source.

The set of attributes $L_W.A$ should contain all attributes that may appear in the data stream supplied by the source. Risk levels for the attributes should be chosen conservatively. A higher risk level assigned to the attribute restricts access to the information derived from the source. Restricted access may be alleviated by stronger suppression, if such suppressor components are available. In this case, specifying a higher risk level is equivalent to requiring valid workflows to apply stronger suppression.

Integrity of the source $L_W.t$ can be used to control suppression. Low integrity sources may supply data in which it is hard to suppress private information, e.g., because steganography methods are used to hide PII in usually non-sensitive data. To prevent unsuccessful suppression, read labels assigned to suppressors should specify a minimum integrity level necessary for suppression.

Sinks and Users. Sink nodes correspond to outputs of the system, and typically represent flows that are presented to end users of the system. For each of the sink nodes, the read labels are used to describe access rights of the recipients of these flows. As discussed above, the user role and access purpose can be specified instead.

Purpose can be uniquely determined by the user role, or the user can be given a choice of purposes, if the policy allows that. If users can choose among multiple purposes, it is hard to detect the situation in which data is requested for one purpose, but used for another. However, auditors may detect a violation even in this case based on the processing history of submitted workflows.

Instantiated Components. Instantiated components are components that are already deployed when the workflow is submitted, and for which labels cannot be changed. Workflows can make use of components already existing in the system, applying different processing to output already deployed workflows to derive new results. It is assumed that instantiated components as principals comply with the MSA model, and that rule (4), which defines the relationship between principal labels, holds for each instantiated component. For these instantiated components, privacy metadata must contain read and write labels.

Deployment of the workflow may involve not only establishing connections between already deployed instantiated components, but also require automated deployment of new component instances. Each of these newly deployed components is an instance of a corresponding component class. Metadata describing a component class includes the location of executable code that must be deployed during component instantiation, as well as various configuration parameters and resource dependencies.

Component class metadata must also include a description of component functionality and access rights from a privacy perspective. As other types of privacy metadata, privacy-related sections of component class description must be protected from unauthorized modification. While a component class itself does not process any data and does not act as a principal in the information flow, component instances become principals, and therefore, must be assigned a set of principal labels. Component class metadata defines template labels that are used to compute principal labels for component instances.

Template labels defined in component class metadata are $(L_R, L_A, L_S, L_D)$, where $L_R$ is the template read label, $L_A$ is the template addition label, $L_S$ is the template selection label, and $L_D$ is the template suppression label. As discussed above, read labels $L_R$ can be specified indirectly by assigning roles and purposes to component classes.

Principal labels for new component instances are computed before deployment of the workflow. Principal labels $(\hat{L}_R, \hat{L}_A, \hat{L}_S, \hat{L}_D, \hat{L}_W)$ are based on the labels of component inputs in the workflow and are derived from template labels using the procedure that will be described below. Principal labels must satisfy the following conditions:

$$\hat{L}_R \preccurlyeq L_R$$

$$\hat{L}_A = L_A$$

$$\hat{L}_S = L_S \downarrow \hat{L}_R$$

$$\hat{L}_D = L_D$$

$$\hat{L}_W \preccurlyeq \hat{L}_R - \hat{L}_S - \hat{L}_A - \hat{L}_D. \qquad (5)$$

The above notation $\hat{L}_S = L_S \downarrow \hat{L}_R$ means that the selection label $\hat{L}_S$ is adjusted to avoid conflicts with the chosen value of label $\hat{L}_R$. This operation removes from $L_S$ the selection of attributes that cannot be contained in the input because of the read access rule (1). More precisely, $\hat{L}_S = L_S \downarrow \hat{L}_R$ holds if and only if the following holds:

$$\hat{L}_S.A = \{(\text{att-selected. } r) \in L_S.A \mid \text{att} \in \text{Attr}(\hat{L}_R)\} \; \hat{L}_S.t = L_S.t$$

In this case, $\hat{L}_S \preccurlyeq L_S$.

The formulas in (5) imply that the description of a component class defines most of the principal labels for components, and establishes an upper bound on the read label in partial order. This bound specifies the maximum sensitivity of the information that the component can access. It is important to specify this label correctly for trusted components performing suppression, since for successful suppression the potential content of the data subjected to suppression must be known. The suppressors can only be trusted to work with data of limited sensitivity and of limited attribute range, and only this data is at or above a given minimum integrity level. $L_R$ allows all these requirements to be specified. The write label $\hat{L}_W$ is chosen to satisfy rule (4), which is repeated in the last inequality of (5).

The ability of this model to adapt to different read labels allows greater flexibility in a workflow configuration. Equations (5) generally allow $\hat{L}_W$ to be smaller for smaller values of $\hat{L}_R$, since from (5) it follows that if $\hat{L}_R \preccurlyeq L_R$, then $\hat{L}_R \sqcup \hat{L}_S \sqcup \hat{L}_A - \hat{L}_D \preccurlyeq L_R \sqcup L_S \sqcup L_A - L_D$, and if $\hat{L}_W = \hat{L}_R \sqcup \hat{L}_S \sqcup \hat{L}_A - \hat{L}_D$, then using Rule (4), $\hat{L}_W = \hat{L}_R \sqcup \hat{L}_S \sqcup \hat{L}_A - \hat{L}_D \preccurlyeq L_R \sqcup L_S \sqcup L_A - L_D \preccurlyeq L_W$, and thus $\hat{L}_R \preccurlyeq L_R \Rightarrow \exists \hat{L}_W : \hat{L}_W \preccurlyeq L_W$. Hence, components working with less sensitive information than the maximum LR allowed by component design can produce an output that is marked as less sensitive, and therefore, is accessible to a broader audience in compliance with the MSA policy.

Workflow Verification. To guarantee that the privacy policy is enforced, verification of workflows for policy compliance must take place before the workflows are deployed. A verification procedure is applied to the workflow in two steps, as shown, for example, in FIG. 5. As shown in FIG. 5, first, read and write labels satisfying rule (4) of the MSA model are assigned to the components that are not yet deployed, and do not have these labels specified directly. The metadata necessary for assigning read and write labels, when these labels are not specified directly, are stored as part of a component class description in a global directory of component classes. At the same time, channel labels are assigned to the edges, such that the channel label of an edge is equal to the write label of a tail node of that edge. Hence, after channel labels have been assigned, the workflow automatically satisfies rule (2).

Once read and write labels satisfying rule (4) have been assigned to every principal in the workflow, and channel labels satisfying rule (2) have been assigned to every edge, the second step of the verification procedure starts. At this step, rule (1) is verified for every principal p and every channel o supplied to p. This condition requires that the read labels of principals dominate channel labels of the edges carrying flow into the principals. If this condition is violated, the workflow is rejected. Otherwise, the workflow with the computed labels complies with all rules of the MSA model, and can be deployed.

A more detailed description of a label assignment algorithm of the workflow verification method will now be described. This algorithm is only performed for verification workflows that require deployment of new components, and the information flow is required to by acyclic.

As discussed above, for each of the sources, the metadata specifies the values of write labels. As shown in FIG. 5, the algorithm proceeds recursively, that is, starting from the sources. At each iteration of the algorithm, channel labels are first assigned to all edges leaving the nodes with assigned write labels. If this assignment causes a conflict with rule (1), the workflow is rejected due to a policy violation. Then, the loop at step 7 of the algorithm assigns read labels to all new component instances that do not have read labels assigned thereto, and to channel labels of all input edges that have been assigned.

The read label assigned to the component instance should allow as little access to sensitive information as possible due to the principle of least privilege. For example, the read label is chosen to be just enough to read the channels received by the component instance. In other words, the READ label $L_R(p)$ satisfies $$\hat{L}_R(p) = \underset{i}{\sqcup} L(o_i)$$

where $L(o_i)(i=1,\ldots,n)$ are labels of the channels to be read by the component. Privacy metadata requires that the read label specified in metadata describing component class P of component p must dominate the read label assigned to p. Furthermore, $\hat{L}_R(p)$ must satisfy constraints C(P) specified in the description of the component class. If either of the two conditions is violated, the workflow must be rejected as shown in step 10.

The selection label specified in the component class metadata may enumerate a large set of attributes, exceeding the set present in the read label of a component instance. The selection label $\hat{L}_S(p)$ assigned to the component instance in step 11 depends on the attributes contained in the channels read by the component instance. More specifically, $\hat{L}_S(p)$ should include the attribute att—selected only if att is contained in the read label $\hat{L}_R(p)$. For example, if $L(o)=<\{(Name,0.6), (Salary,1)\},t>$ and $L_S(P)=<\{(Name-selected,1), (SSN-selected,1)\},t>$, the algorithm assigns $\hat{L}_S(P)=<\{(Name-selected,1)\},t>$.

After the principal labels are assigned to the component instance p of class P, the write label $L_W(p)$ is determined as $\hat{L}_W(p)=\hat{L}_R(p) \sqcup \hat{L}_S(p) \sqcup \hat{L}_A(p) - \hat{L}_D(o)$, in accordance with (5). Iterations are repeated until all workflow edges have been assigned channel labels.

In FIG. 5, the algorithm terminates after a finite number of iterations, which does not exceed the number of nodes in the workflow. It is also straightforward to show that this algorithm assigns labels such that if a feasible assignment exists, a feasible solution will be found by the algorithm, and the workflow will be accepted. Further, label assignment is feasible if it satisfies rules (1), (2), (4) and component instantiation rules (5).

Runtime Enforcement and MLS. The verification method described above helps prevent the deployment of privacy-violating workflows. However, in run-time, continuous privacy policy enforcement is required to make sure that the information flows stay within the boundaries defined by the approved workflow specifications which were initially submitted for deployment.

In particular, the system runtime must ensure that there are no information flows except those permitted by rules (1) and (2). It is easy to see that these rules can be satisfied if and only if for every principal p receiving information from any principal p, the following condition on the corresponding read and write labels is satisfied (6):

$$L_W(p) \preccurlyeq L_R(p')$$

Access control mechanisms of existing multi-level secure (MLS) systems, such as IBM zSeries IBMCorporation. http://www.ibm.com/servers/eserver/zseries/security/mls.html, can be leveraged to enforce the MSA model constraints. This can be achieved by creating an order preserving one-to-one mapping $M(\cdot)$ between MSA labels L and MLS labels l, such that for all MSA labels $L \preccurlyeq L'$ it follows that $M(L) \preccurlyeq M(L')$, in the partial order. of MLS, and for all l.l' it follows that $M^{-1}(l) \preccurlyeq M^{-1}(l')$. With this mapping, the MLS enforcement mechanisms will automatically enforce the MSA condition (6) by enforcing a similar constraint of the Bell-LaPadula policy on corresponding MLS labels.

An MLS label l=(s,C) is a combination of a secrecy level s and a category set C. Secrecy level can be chosen from one of several discrete values, such as unclassified or secret. The category set contains the categories relevant to the data described by the label. The relation is defined as follows: (s,C). (s',C') if and only if s≦s' and C ⊂ C'.

Assume that over all MSA labels at most n different risk levels are used for each attribute. Since the number of labels is finite, this is a reasonable assumption. For each attribute att, define MLS categories att-1, att-2, . . . , att-n. Similarly, for m integrity levels define MLS categories int-1, int-2, . . . , int-m. The mapping M is defined as follows: (s,C)=M(L), where s is constant and $$C := C(L) = (\cup_{(att,r) \in L.A} \cup_{i=1}^{\mu(r)} \{att\text{-}i\}) \cup (\cup_{i=L.t}^{m} \{int\text{-}i\}),$$

where μ(r) is the position of risk value r in the ascending order of n risk values. This mapping has all the required properties.

If privacy suppressors must be supported, the MLS implementation must support trusted downgraders, which are allowed to violate the "no write-down" rule of the Bell-LaPadula policy. It should also be noted that the mapping between MSA and MLS can be modified such that existing MLS labels on the channels can be used jointly with MSA labels, enforcing regular MLS data confidentiality protection in addition to MSA privacy protection constraints.

Auditing of MSA Metadata Correctness. The MSA model makes final access control decisions based on the label assigned to the flow leaving the system. These labels, and therefore these decisions, can only be trusted if the metadata assigned to components and sources exactly or with conservative overprotection represents the functionality of the components and the contents of the sources. Thus, it is crucial for successful deployment of an MSA-based system to establish procedures for verifying the correctness of the metadata, e.g., by performing code reviews or selective logging and auditing of data flows.

The following aspects of MSA metadata have been identified as requiring attention during auditing.

Confidentiality violations. A write label assigned to a source does not contain all sensitive attributes contained in the output of the source, or contains these attributes with levels lower than the observed levels. Sensitive information added by a component to its output is not reflected in the addition label of the component. Sensitive attribute suppression declared in the suppression label of a component is not performed correctly.

Anonymity violations. Selection on sensitive attributes performed by a component is not represented in the selection label of the component.

Integrity violations. An integrity level assigned to the write label of a component is above the true integrity level. A write label assigned to a source specifies an integrity higher than true integrity of the data.

Note that in this description there is no distinction between components and component classes, assuming that component class metadata must be valid for all possible component instantiations.

Attribute Combination Constraints. In many practical applications rule (1) needs to be extended to take into account combinations of attributes. Recall that the original rule (1) requires that the read label of a component dominates the object label of the channel:

$$L(o) \preccurlyeq L_R.$$

This condition is then extended by adding to this condition a principal-specific set of combinations that are not allowed to appear in any channel connected to the principal. For example, the combination of SSN and FullName attributes can be prohibited, while SSN or FullName alone are allowed. The set of combinations is then stored as part of component or component class metadata, together with the read label, or a read template label.

In accordance with an exemplary embodiment of the present invention, the privacy protection framework based on the MSA access control policy supports a general composition architecture where data streams are processed by workflows formed of stream processing components connected by communication channels. In the framework, any component may produce new streams of data that become available for analysis by other components. The framework can easily be enforced in existing MLS systems that implement the Bell-LaPadula policy. This together with an RBAC approach makes configuration and administration of the framework simple and practical. For example, while additional tools are needed to visualize and modify MSA labels at the level of system administrators and users, the underlying enforcement mechanisms of MLS systems do not require any modification.

In addition, the framework supports suppression algorithms with varying degrees of suppression. Further, the MSA policy can prevent a disclosure of results derived from selected data if the selection criteria leads to a mechanism similar to those used in the RBAC approach.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for protecting information in a distributed stream processing system, comprising:
assigning, by using a processor, a principal label to a processing component, wherein the processing component receives data and includes a program that transforms the data to produce new data as output, and wherein the principal label identifies a name and risk level for each data attribute readable by the processing component,
assigning, by using the processor, a channel label to a first communication channel that is connected to an input of the processing component, wherein the channel label includes a name and risk level of each data attribute present in the first communication channel;
determining, by using the processor, if the risk levels of the data attributes of the first communication channel are higher than at least one, but not all, of the risk levels of the data attributes of the principal label; and
preventing, by using the processor, the processing component from reading all the data attributes of the first communication channel based on a determination that the risk levels of the data attributes of the first communication channel are higher than at least one, but not all, of the risk levels of the data attributes of the processing component,
wherein the principal label includes a read label that identifies the risk levels of the data attributes readable by the processing component, a write label that ensures communication channels written to by the processing component are permitted to receive the data output from the processing component, a selection label that identifies selection operations performed by the processing component on at least one of the data attributes read by the processing component, an addition label that includes new data attributes added to the data output by the processing component and a suppression label that identifies which of the data attributes read by the processing component has its risk level decreased by the processing component.

2. The method of claim 1, wherein the processing component has an integrity level that identifies a level of trustworthiness of the data attributes readable by the processing component.

3. The method of claim 1, wherein the first communication channel has an integrity level that identifies a level of trustworthiness of the data attributes of the first communication channel.

4. The method of claim 1, wherein the channel label includes a processing history of the first communication channel, wherein the processing history is based on the selection label.

5. The method of claim 1, wherein a risk level of a first data attribute of the first communication channel represents a risk of disclosing information corresponding to the first data attribute if contents of the first communication channel collected over a first time are disclosed.

6. The method of claim 1, wherein the first communication channel is a one-way link allowing a data stream to flow from its source to its destination.

7. The method of claim 1, further comprising:
reading, at the processing component, the data attributes of the first communication channel in response to a determination that the risk levels of the data attributes of the first communication channel are equal or less than the risk levels of the data attributes readable by the processing component;
assigning, by using the processor, a channel label to a second communication channel that is connected to an output of the processing component, wherein the channel label of the second communication channel includes risk levels of data attributes that can be read by the second communication channel; and
writing, from the processing component to the second communication channel, the data attributes read, produced or modified by the processing component in response to a determination that the risk levels of the data attributes readable by the second communication channel are equal or less than the risk levels of the data attributes read, produced or modified by the processing component.

8. The method of claim 7, further comprising:
assigning, by using the processor, a user label to a user that is connected to an output of the second communication channel, wherein the user label identifies risk levels of data attributes that are readable by the user; and
reading, by the user, the data attributes of the second communication channel in response to a determination that the risk levels of the data attributes readable by the user are equal or greater than the risk levels of the data attributes of the second communication channel.

9. The method of claim 8, wherein the data attributes of the user label include a user name and a user role/purpose.

10. The method of claim 7, wherein the risk level of at least one of the data attributes input to the second communication channel was initially greater than the risk levels readable by the second communication channel but was decreased by the processing component according to the suppression label.

11. The method of claim 10, wherein the risk level of at least one of the data attributes read, produced or modified by the processing component was not decreased by the suppression label and this data attribute was not input to the second communication channel due to the selection label identifying this data attribute as restricted from being read by the second communication channel.

12. A computer program product comprising a non-transitory computer useable medium having computer readable program code recorded thereon for protecting information in a distributed stream processing system, the computer readable program code comprising:
computer readable program code for assigning a principal label to a processing component, wherein the processing component receives data and includes a program that transforms the data to produce new data as output, and wherein the principal label identifies a name and risk level for each data attribute readable by the processing component,
computer readable program code for assigning a channel label to a first communication channel that is connected to an input of the processing component, wherein the channel label includes a name and risk level of each data attribute present in the first communication channel;
computer readable program code for determining if the risk levels of the data attributes of the first communication channel are higher than at least one, but not all, of the risk levels of the data attributes of the principal label; and
computer readable program code for preventing the processing component from reading all the data attributes of the first communication channel based on a determination that the risk levels of the data attributes of the first communication channel are higher than at least one, but not all, of the risk levels of the data attributes of the processing component,
wherein the principal label includes a read label that identifies the risk levels of the data attributes readable by the processing component, a write label that ensures communication channels written to by the processing component are permitted to receive the data output from the processing component, a selection label that identifies selection operations performed by the processing component on at least one of the data attributes read by the processing component, an addition label that includes new data attributes added to the data output by the processing component and a suppression label that identifies which of the data attributes read by the processing component has its risk level decreased by the processing component.

13. The computer program product of claim 12, further comprising:
   computer readable program code for causing the processing component to read the data attributes of the first communication channel in response to a determination that the risk levels of the data attributes of the first communication channel are equal or less than the risk levels of the data attributes readable by the processing component;
   computer readable program code for assigning a channel label to a second communication channel that is connected to an output of the processing component, wherein the channel label of the second communication channel includes risk levels of data attributes that can be read by the second communication channel; and
   computer readable program code for causing the data attributes read, produced or modified by the processing component to be written to the second communication channel in response to a determination that the risk levels of the data attributes readable by the second communication channel are equal or less than the risk levels read, produced or modified by the data attributes of the processing component.

14. The computer program product of claim 13, further comprising:
   computer readable program code for assigning a user label to a user that is connected to an output of the second communication channel, wherein the user label identifies risk levels of data attributes that are readable by the user; and
   computer readable program code for causing the user to read the data attributes of the second communication channel in response to a determination that the risk levels of the data attributes readable by the user are equal or greater than the risk levels of the data attributes of the second communication channel.

\* \* \* \* \*